July 16, 1929.  G. L. HERTZ  1,720,675
MANUFACTURE OF OXIDE CATHODES
Filed July 25, 1924
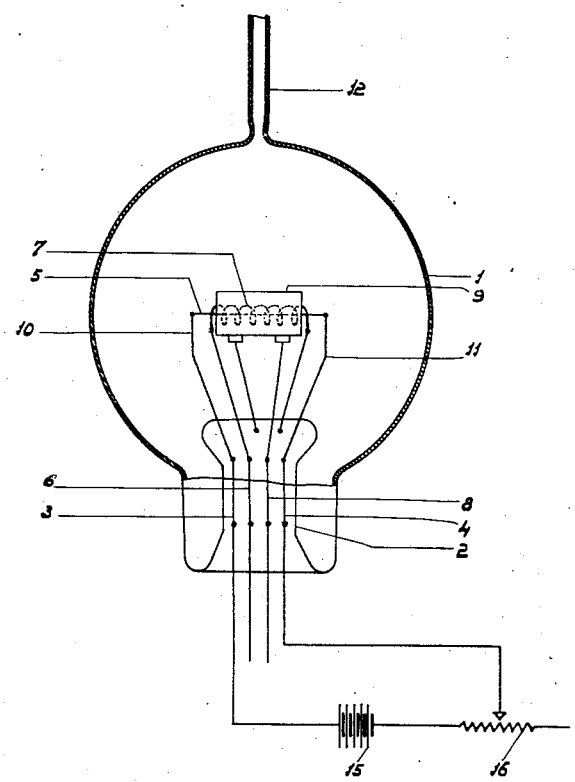

Patented July 16, 1929.

1,720,675

UNITED STATES PATENT OFFICE.

GUSTAV LUDWIG HERTZ, OF EINDHOVEN, NETHERLANDS, ASSIGNOR TO NAAMLOOZE VENNOOTSCHAP PHILIPS' GLOEILAMPENFABRIEKEN, OF EINDHOVEN.

MANUFACTURE OF OXIDE CATHODES.

Application filed July 25, 1924, Serial No. 728,245, and in the Netherlands February 18, 1924.

This invention has reference to the manufacture of electrodes known as "oxide cathodes" for use in electric discharge tubes such for example as transmission or receiving valves for wireless telegraphy, telephony and similar purposes, X-ray tubes and rectifiers. Such electrodes have hitherto consisted of a body of for example platinum coated with certain metal oxides yielding a very intense emission of electrons on raising the temperature. Preferably alkaline earth oxides are used for the active layer.

In the manufacture and practical use of the said electrodes (which were described for the first time by Wehnelt), various difficulties have been encountered. Thus, for example the dropping off of the layer of oxide, the variable working of the electrode by reason of uneven heating of the layer, and the disappearance of the oxide were troublesome whilst also the high ohmic resistance of the active layer must be mentioned as a detrimental characteristic.

Various methods have already been proposed to improve the properties of the layer of oxide. Thus, for example, it has been suggested to apply the active layer to a core consisting of an alloy of platinum and nickel.

In the process according to the present invention, a body of which at least part of the surface consists of an oxide of one or more metals capable of alloying with the alkaline earth metals, is coated with one or more alkaline earth metals, whereupon the body is so heated in a non-oxidizing atmosphere that the alkaline earth metal layer fuses and after that the alkaline earth metal is at least partly oxidized. This oxidation operation may be effected by a special oxidizing process or by reaction between the alkaline earth metal and the metal oxide serving as an underlayer.

Metals adapted for alloying with the alkaline earth metals and for being oxidized are for example nickel and copper. Very good results are obtained if at least part of the surface of the body consists of copper oxide.

Furthermore it may be advantageous to heat the body after the oxidation operation in a reducing atmosphere.

The electrode constructed according to the process of the invention shows various advantages over those hitherto known.

The active material is finely divided between the material of the surface of the electrode. Consequently there is no longer any question about a layer capable of dropping off or introducing a great ohmic resistance in the circuit. The electrode yields a very high emission of electrons and has a fair life.

The particular shape of the body from which the cathode is formed depends on the purpose for which it is wished to use the electrode. In many cases the body will have the shape of a wire and in this case the entire surface of the wire will as a rule be coated with the oxide of a metal capable of alloying with the alkaline earth metals, preferably copper oxide, it being wished to use the entire wire as an oxide cathode during the operation of the discharge tube. The body may however be quite differently shaped, when it may be sufficient in some cases that only part of the surface of the body contains the metal oxide.

The oxide of a metal capable of alloying with the alkaline earth metals may be applied in different ways to the surface of the body. Preferably first the metal itself is applied to the surface, for example by electrolysis, and then the said metal is partly or wholly oxidized. It has been found that it is not necessary that that part of the surface of the body which is intended to serve later on for the emission of electrons, should consist entirely of the oxide of one or more metals capable of alloying with the alkaline earth metals. Good results are also obtained if a body containing at its surface one or more metals capable of alloying with the alkaline earth metals, is so heated in an oxidizing atmosphere, that only parts of the surface oxidize.

The core of the body having applied to its surface for example copper oxide, may preferably consist of a metal or an alloy of metals which are not readily alloyed with the alkaline earth metals, such for example as molybdenum or nickel chromium. Very good results are obtained for example if a core of molybdenum or nickel chromium has applied to it a sheath of copper or any other metal capable of alloying with the alkaline earth metals, whereupon the body is oxidized.

However, also other metals preferably highly refractory such as platinum or alloys of platinum such for example as platinum-rhodium, nickel or palladium may be used for the core of the body.

The oxidation operation to which the body containing at its surface for example copper is subjected, may consist in heating the body in air. Thus the copper is wholly or partly oxidized and the body thus treated is coated with some alkaline earth metal. This may be effected in various ways for example by a distillation process or by applying a certain quantity of alkaline earth metal to the surface of the body and fusing the said metal so that it spreads over the surface. The body may however be coated with a compound decomposing by heat and producing the alkaline earth metal. For this purpose an azide of an alkaline earth metal or a mixture of such compounds for example may be used. They decompose in the presence of heat, so that the alkaline earth metal is produced.

The body must now be heated in a non-oxidizing atmosphere, consequently in a high vacuum or in a neutral or reducing gaseous atmosphere. Heating to slightly beyond the melting point of the alkaline earth metal is sufficient in this case. The alkaline earth metal fuses, spreads over the surface of the electrode and is finely divided between the material of the surface. It is not unlikely that during this heating the alkaline earth metal forms an alloy with the copper or with another similar metal. The electrode may be heated for this operation in a furnace or electrically. If this is inconvenient, the electrode may be located in an atmosphere of rare gas and heated therein to the desired temperature under the influence of an electric discharge across the rare gas, the body being connected as a cathode.

When by this heating the alkaline earth metal is sufficiently distributed over the surface of the electrode, at least part of the alkaline earth metal must be oxidized. This may be effected by subjecting the electrode to an oxidation operation, preferably by exposing the electrode to dry air. However a special oxidation operation may be superfluous, as in some cases the alkaline earth metal may be converted at least partly into the oxide under the influence of the copper oxide found on the electrode or of impurities. Sometimes, it may be advantageous to take care that not all the alkaline earth metal is oxidized. Barium for example has per se a strong gas-purifying effect, so that it may be advantageous, when a little metallic barium remains in the electrode, which metal volatilizes during the operation of the discharge tube.

Good results may be obtained with the electrode thus treated. In some cases it may be advisable to submit the surface of the body to the influence of the electric discharge of a rare gas, the body being connected as a cathode. Furthermore, an improvement of the electrode in that the emission of electrons is materially increased, may still be obtained by finally heating the electrode in a reducing atmosphere.

The electrode may be heated in an atmosphere of hydrogen or in an atmosphere of magnesium vapour but it also may be heated first in hydrogen and then in magnesium vapour.

Electrodes according to the invention may be manufactured in a continuous process. In this case a wire may be started consisting of a core of highly refractory metal and a sheath of copper. The said wire may be moved forward and thus first oxidized by heating in an oxidizing atmosphere, then coated with alkaline earth metal by passing the wire through a solution or through the vapour of a compound decomposing by heat and producing the alkaline earth metal, whereupon the wire is heated again so that the alkaline earth metal fuses, etc.

An example of carrying out the process according to the invention will be more fully described with reference to the accompanying drawing which illustrates a three-electrode tube, the cathode of which is an oxide cathode constructed according to the invention.

On the drawing is shewn the glass envelope 1 of the discharge tube, a glass stem 2 being hermetically sealed in it. In the clamped portion of this glass stem are hermetically sealed leading-in wires 3 and 4 for the incandescent cathode 5, leading-in wire 6 for the grid 7 and a leading-in wire 8 for the anode 9. The electrodes are in known manner arranged concentrically in relation to each other. For the cathode 5 a wire is taken consisting for example of a nickel chromium core with a copper sheath. This wire is heated in air, for example electrically or by a gas burner, so that the copper is oxidized at its surface, whereupon the wire is coated with an alkaline earth metal, for example barium. It is desirable that the layer should be spread over the surface as evenly as possible. This may be ensured by allowing a solution of barium azide to run in drops along the wire and subsequently drying the solution applied so that a layer of barium azide remains on the wire.

The wire thus treated is secured to supporting wires 10 and 11, arranged with the electrodes 7 and 9 on the stem 2, and then the entire set of electrodes is hermetically sealed in the bulb. This bulb is exhausted by means of the tubule 12 and the wire 5 is slowly heated by locating the bulb in a furnace, the heating being effected to such an extent that the barium azide decomposes into nitrogen and barium. The nitrogen produced is removed preferably by continuous pumping through the tube 12.

Then the wire 5 is heated again to slightly beyond the melting point of barium, which metal spreads over the surface of the wire and is finely divided between the material of this surface, whereby it is at least partly oxidized.

In order to enable the three-electrode tube to be used for wireless telegraphy, telephony and similar purposes, the bulb 1 is exhausted in known manner and the glass wall of the bulb and the electrodes 7 and 9 are likewise in known manner deprived of the occluded gases.

It is furthermore advantageous to anneal the wire in an atmosphere of magnesium vapour. Some magnesium may for example be applied to the anode and evaporated by heating the anode by the bombardment of electrons. The magnesium remains in the finished discharge tube and continues exerting a favourable effect on the emission of electrons and the life of the oxide cathode.

It is evident that the oxide cathode according to the invention is illustrated only by way of example in a three-electrode discharge tube. Of course, it may be used with the same favorable results in discharge tubes having four or more electrodes, in rectifiers etc.

What I claim is:—

1. A method of manufacturing oxide cathodes comprising the coating of a body with an alkaline earth metal, at least a part of the surface of said body consisting of an oxide of one or more metals capable of alloying with said alkaline earth metals, the heating of the coated body in a non-oxidizing atmosphere in order to melt the alkaline earth metal layer and the at least partly oxidizing of the alkaline earth metal.

2. A method of manufacturing oxide cathodes comprising the coating of a body with an alkaline earth metal, at least a part of the surface of said body consisting of copper oxide, the heating of the coated body in a non-oxidizing atmosphere in order to melt the alkaline earth metal layer and the at least partly oxidizing of the alkaline earth metal.

3. A method of manufacturing oxide cathodes comprising the coating of a body with an alkaline earth metal, at least a part of the surface of said body consisting of an oxide of one or more metals capable of alloying with the alkaline earth metals, the heating of the coated body in a non-oxidizing atmosphere in order to melt the alkaline earth metal layer, the at least partly oxidizing of the alkaline earth metal and finally the heating of the body in a reducing atmosphere.

4. A method of manufacturing oxide cathodes comprising the coating of a body with an alkaline earth metal, at least a part of the surface of said body consisting of an oxide of one or more metals capable of alloying with the alkaline earth metals, the heating of the coated body in a non-oxidizing atmosphere in order to melt the alkaline earth metal layer, the at least partly oxidizing of the alkaline earth metal and finally the heating of the body in an atmosphere of an electro-positive element.

5. A method of manufacturing oxide cathodes comprising the coating of a body with an alkaline earth metal, at least a part of the surface of said body consisting of an oxide of one or more metals capable of alloying with an alkaline earth metal, the heating of the coated body in a non-oxidizing atmosphere in order to melt the alkaline earth metal layer, the at least partly oxidizing of the alkaline earth metal and finally the heating of the body in an atmosphere of the vapor of one element of the group consisting of magnesium and hydrogen.

6. A method of manufacturing oxide cathodes comprising the coating of a body with an alkaline earth metal, at least a part of the surface of the body consisting of a copper oxide, the heating of the coated body in a non-oxidizing atmosphere in order to melt the alkaline earth metal layer, the at least partly oxidizing of the alkaline earth metal and finally the heating of the body in a reducing atmosphere.

7. A method of manufacturing oxide cathodes comprising the coating of a body with an alkaline earth metal, at least a part of the surface of said body consisting of an oxide of one or more metals capable of alloying with said alkaline earth metals, said body having a core of a metal not capable of alloying with the alkaline earth metals, the heating of the coated body in a non-oxidizing atmosphere in order to melt the alkaline earth metal and the at least partly oxidizing of the alkaline earth metal.

8. A method of manufacturing oxide cathodes comprising the coating of a body with an alkaline earth metal, at least a part of the surface of said body consisting of an oxide of one or more metals capable of alloying with said alkaline earth metals, said body having a core of a metal not capable of alloying with the alkaline earth metals, the heating of the coated body in a non-oxidizing atmosphere in order to melt the alkaline earth metal layer, the at least partly oxidizing of the alkaline earth metal and finally the heating of the body in a reducing atmosphere.

9. A method of manufacturing oxide cathodes comprising the coating of a body with alkaline earth metal, at least a part of the surface of said body consisting of copper oxide, the body having a core of metal not capable of alloying with the alkaline earth metals, the heating of the coated body in a nonoxidizing atmosphere in order to melt the alkaline earth metal layer, the at least partly oxidizing of the alkaline earth metal and finally the heating of the body in a reducing atmosphere.

10. The method of coating a cathode for an electron discharge device which comprises preparing a core of a metal incapable of alloying with the alkaline earths, depositing a coating of a metal capable of alloying with the alkaline earths, oxidizing said coating, applying an alkaline earth metal to said coating and heating said cathode whereby said alkaline earth metal partially alloys with said coating and is partially oxidized thereby.

11. The method of coating a cathode for an electron discharge device which comprises preparing a core of a refractory metal incapable of alloying with the alkaline earths, depositing a coating of a metal capable of alloying with the alkaline earths, oxidizing said coating, applying an alkaline earth metal to said coating and heating said cathode whereby said alkaline earth metal partially alloys with said coating and is partially oxidized thereby.

12. The method of coating a cathode for an electron discharge device which comprises preparing a core of a refractory metal incapable of alloying with the alkaline earths, depositing a coating of one of the metals of the group consisting of nickel or copper, oxidizing said coating, applying an alkaline earth metal to said oxidized coating, and heating the cathode whereby said alkaline earth metal partially alloys with said coating and is partially oxidized thereby.

13. An oxide coated cathode for electron discharge devices comprising a core of a refractory metal, a coating of one of the metals of the group of copper and nickel applied to said core, and a coating of an alkaline earth metal alloyed with said first mentioned coating.

14. An oxide coated cathode for electron discharge devices comprising a core of a refractory metal, a coating of metal capable of alloying with the alkaline earth metals applied to said core and a coating of alkaline earth metal applied to said first mentioned coating and partially alloyed therewith.

15. An oxide coated cathode for electron discharge devices comprising a core of a refractory metal incapable of alloying with the alkaline earth metals, a coating of a metal capable of alloying with the alkaline earth metals applied to said core, and a layer of alkaline earth metal applied to said coating, said layer being partially alloyed with said coating and being also partially oxidized.

In testimony whereof I affix my signature, at the city of Eindhoven, this 27th day of June, 1924.

GUSTAV LUDWIG HERTZ.